(12) United States Patent
Cherkassky et al.

(10) Patent No.: US 9,698,674 B1
(45) Date of Patent: Jul. 4, 2017

(54) TIMING BASED APPROACH FOR EFFICIENT SWITCHED MODE POWER CONVERSION

(71) Applicant: Silicon Laboratories Inc., Austin, TX (US)

(72) Inventors: Alexander Cherkassky, Hollis, NH (US); Bruce Del Signore, Hollis, NH (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/983,781

(22) Filed: Dec. 30, 2015

(51) Int. Cl.
G05F 1/24 (2006.01)
H02M 3/04 (2006.01)
H02M 3/158 (2006.01)
G05F 1/56 (2006.01)

(52) U.S. Cl.
CPC ........... H02M 3/04 (2013.01); H02M 3/1582 (2013.01); G05F 1/56 (2013.01)

(58) Field of Classification Search
CPC .. H02M 3/156; H02M 3/1582; H02M 3/1588; H02M 3/1584; H02M 3/157
USPC ................. 323/222, 259, 271, 272, 282–285
See application file for complete search history.

(56) References Cited

U.S. PATENT DOCUMENTS 7,298,119 B1 * 11/2007 Amram Summit . H02M 3/1582
323/225
8,129,961 B2 * 3/2012 Buethker ............ H02M 3/1582
323/224
2009/0167259 A1 * 7/2009 Miyamae ............ H02M 3/1582
323/225
2009/0251122 A1 * 10/2009 Singnurkar ......... H02M 3/1582
323/311
2013/0249507 A1 9/2013 Kim et al.

OTHER PUBLICATIONS

Jung, M., et al., "An Error-Based Controlled Single-Inductor 10-Output DC-DC Buck Converter with High Efficiency at Light Load Using Adaptive Pulse Modulation," 2015 IEEE International Solid-State Circuits Conference, Session 12, Inductor-Based Power Conversion, 12.5, 3 pages.

Su, Y., et al., "90% Peak Efficiency Single-Inductor-Multiple-Output DC-DC Buck Converter with Output Independent Gate Drive Control," 2015 IEEE International Solid-State Circuits Conference, Session 12, Inductor-Based Power Conversion, 12.6, 3 pages.

* cited by examiner

*Primary Examiner* — Nguyen Tran
(74) *Attorney, Agent, or Firm* — Zagorin Cave LLP

(57) ABSTRACT

A DC-DC converter includes a plurality of switches configured to be in a first charging mode until current through an inductor reaches a first current threshold to thereby indicate an end of the first charging mode. Responsive to the end of the first charging mode the DC-DC converter is configured to operate in a second charging mode for a time period $\Delta T$ in which a first side of the inductor is coupled to an input voltage and a second side of the inductor is coupled to a load. Responsive to the end of the time period $\Delta T$, the DC-DC converter operates in a discharge mode until current through the inductor reaches its minimum.

16 Claims, 8 Drawing Sheets

| mode | Inductor charge | | Inductor discharge | | Middle zone | |
|---|---|---|---|---|---|---|
| | Close switches | Open switches | Close switches | Open switches | Close switches | Open switches |
| buck | S1, S4 | S2, S3 | S2, S4 | S1, S3 | X | X |
| boost | S1, S3 | S2, S4 | S1, S4 | S2, S3 | X | X |
| buck-boost | S1, S3 | S2, S4 | S2, S4 | S1, S3 | X | X |
| new mode A | S1, S3 | S2, S4 | S2, S4 | S1, S3 | S1, S4 | S2, S3 |
| new mode B | S1, S4 | S2, S3 | S2, S4 | S1, S3 | S1, S4 | S2, S3 |

Fig. 8B

TIMING BASED APPROACH FOR EFFICIENT SWITCHED MODE POWER CONVERSION

BACKGROUND

Field of the Invention

This application relates to voltage converters and more particularly to a time based approach for more efficient switched mode power conversion in DC-DC converters.

Description of the Related Art

Traditional DC-DC converters typically employ one of three operating modes: a) buck, b) boost, or c) buck-boost. FIG. 1 shows a DC-DC converter 100 including switches S1, S2, S3, and S4 that may be configured for all three operating modes by varying the switch setting.

In a buck mode of the DC-DC converter, switches S1 and S4 are closed (S2 and S3 open) during the charge cycle ($T_{ON}$) for the inductor 101. During the discharge cycle ($T_{OFF}$), S2 and S4 are closed (S1 and S3 open). FIG. 2A shows current flowing through the inductor 100 during the charge and discharge cycles. The inductor current reaches its peak at Ip and then the discharge portion of the cycle begins. The discharge cycle ends when the inductor current reaches zero. The cycle then repeats.

In a boost mode, switches S1 and S3 are closed (S2 and S4 open) during the charge cycle ($T_{ON}$) for the inductor. During the discharge cycle ($T_{OFF}$), S1 and S4 are closed (S2 and S3 open). FIG. 2B shows current flowing through the inductor during the charge and discharge cycles. The inductor current reaches its peak at Ip and then the discharge portion of the cycle begins.

In a buck-boost mode, switches S1 and S3 are closed (S2 and S4 open) during the charge cycle ($T_{ON}$) for the inductor. During the discharge cycle ($T_{OFF}$), S2 and S4 are closed (S1 and S3 open). FIG. 2C shows current flowing through the inductor during the charge and discharge cycles. The inductor current reaches its peak at Ip and then the discharge portion of the cycle begins.

The above conventional modes all suffer from drawbacks in the increasingly popular pulse frequency modulation (PFM) configuration having multiple outputs sharing a single inductor. A particularly important drawback of buck and boost methods is poor response when the output voltage 103 operates close to the input voltage (battery 105) causing unacceptably long inductor charging or discharging times. The buck-boost method shown in FIG. 2C improves this response time, but at the price of significant loss in energy efficiency due to the need to operate at high switching frequency. The high frequency is needed because less energy is transferred to the load during a charge/discharge cycle. That can be seen graphically as the area under the curves in FIG. 2C is smaller than in 2A or 2B for any particular cycle. An additional disadvantage of the above traditional methods is the need for a user to manually set the operating mode i.e. buck, boost, or buck-boost.

Accordingly, improvements in DC-DC converters is desirable to overcome the disadvantages described above.

SUMMARY OF EMBODIMENTS OF THE INVENTION

Accordingly, new operating modes are provided for a DC-DC converter that result in significant power efficiency improvement, thus prolonging battery life, for such applications as hand-held and internet of things (IOT) applications requiring low power consumption. In addition, the new operating modes, when used in DC-DC converters having a single inductor for multiple outputs, reduce interaction between the outputs, and enables seamless operation across multiple modes (buck, boost, and buck-boost), while also enabling to serve higher load currents compared to conventional implementations.

Accordingly, in one embodiment a method for operating a voltage converter includes operating the voltage converter in a first charging mode until current through an inductor reaches a first current threshold. After the first charging mode, the voltage converter operates in an intermediate charging mode, in which current is supplied to a load until an end of a time period. In response to the end of the time period, the voltage converter operates in a third charging mode, the third charging mode being a discharge mode.

In another embodiment, a voltage converter includes an inductor and control logic. The control logic configures a plurality of switches to place the voltage converter in a first charging mode, and the voltage converter remains in that first charging mode until current through the inductor reaches a first current threshold. The control logic is responsive to the current through the inductor reaching the first current threshold to configure the switches to cause the voltage converter to operate in a second charging mode in which a first side of the inductor is coupled to the first voltage and a second side of the inductor is coupled to a load. Compare logic compares elapsed time in the second charging mode to a time threshold to determine an end of the second charging period. The control logic is responsive to the end of the second charging period to configure the switches to operate the voltage converter in a discharge mode in which the first side of the inductor is coupled to ground and the second side of the inductor is coupled to the load.

In still another embodiment, a DC-DC converter includes a plurality of switches configured to be in a first charging mode until current through an inductor reaches a first current threshold to thereby indicate an end of the first charging mode. Responsive to the end of the first charging mode the DC-DC converter is configured to operate in a second charging mode for a time period $\Delta T$ in which a first side of the inductor is coupled to an input voltage and a second side of the inductor is coupled to a load. Responsive to an end of the time period $\Delta T$, the DC-DC converter is configured to operate in a discharge mode.

BRIEF DESCRIPTION OF THE DRAWINGS

The present invention may be better understood, and its numerous objects, features, and advantages made apparent to those skilled in the art by referencing the accompanying drawings.

FIG. 8B shows a table with the various switch settings for the various modes described herein.

The use of the same reference symbols in different drawings indicates similar or identical items.

DETAILED DESCRIPTION

Figure 1:
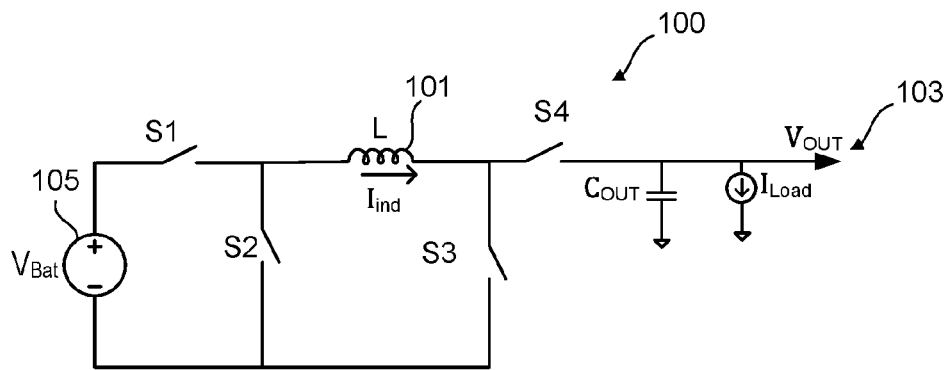
FIG. 1 illustrates shows a DC-DC converter including switches that may be configured to operate the DC-DC converter in either buck, boost, or buck-boost modes.
Figure 2A:
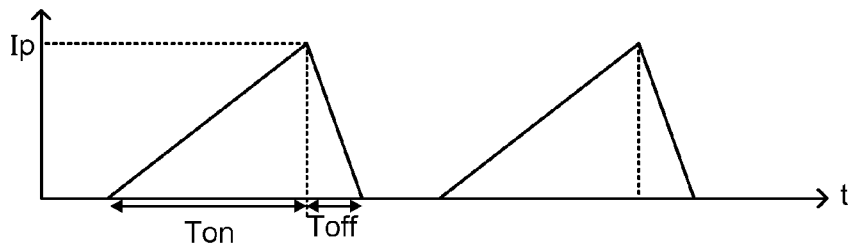
FIG. 2A illustrates the current through the inductor while the DC-DC converter is operating in buck mode.
Figure 2B:
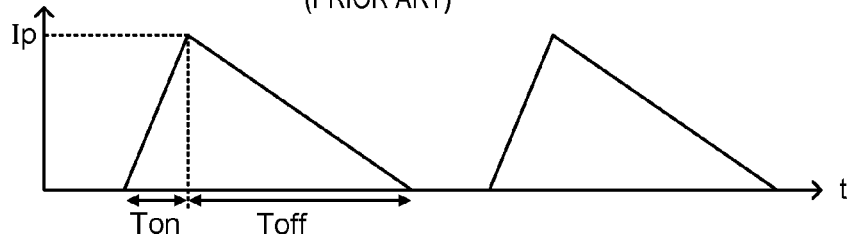
FIG. 2B illustrates the current through the inductor while the DC-DC converter is operating in boost mode.
Figure 2C:
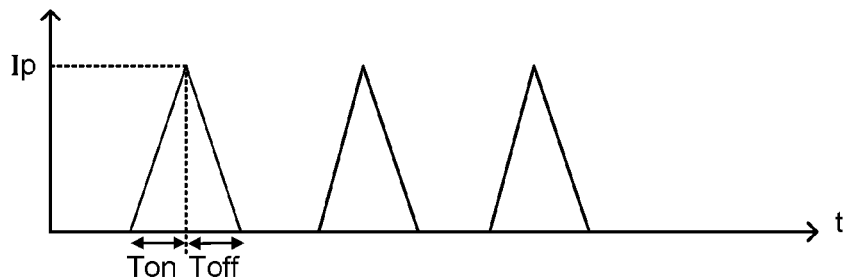
FIG. 2C illustrates the current through the inductor while the DC-DC converter is operating in buck-boost mode.
Figure 3:
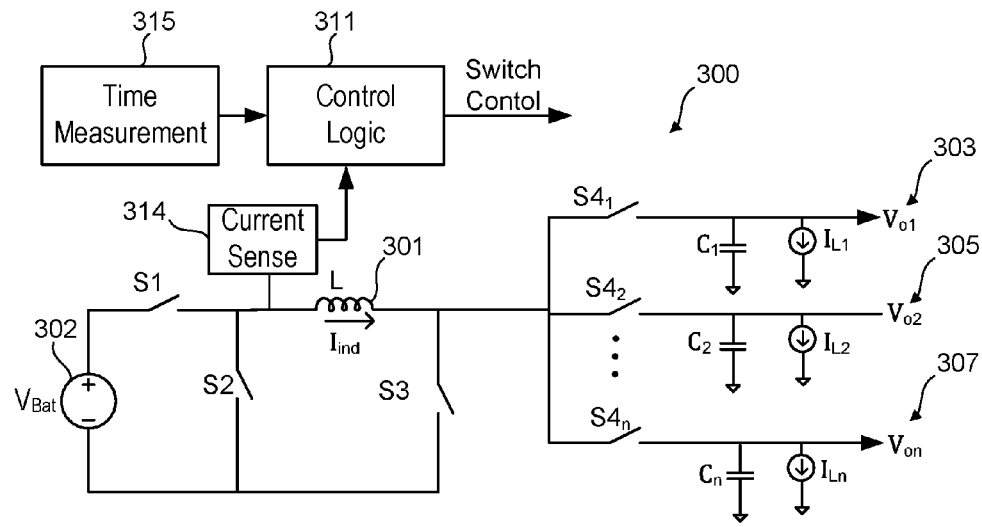
FIG. 3 illustrates single inductor multiple output DC-DC converter according to an embodiment.
Figure 4:
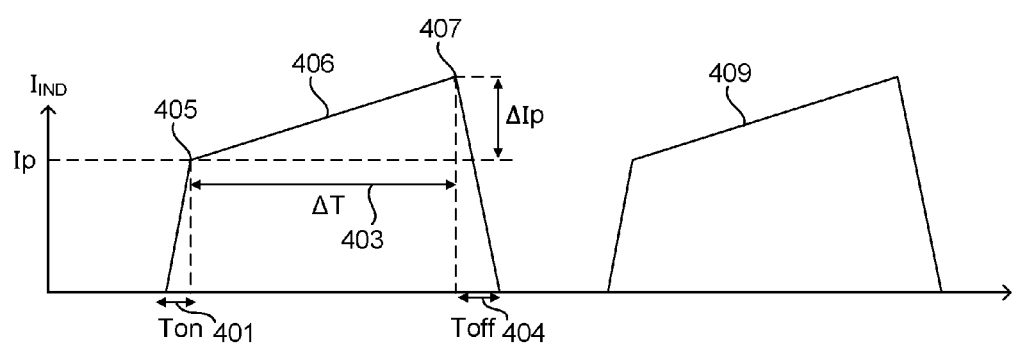
FIG. 4 illustrates current flow through the inductor for an embodiment in which a new mode A is operated as buck (output voltage lower than battery voltage).
Figure 5:
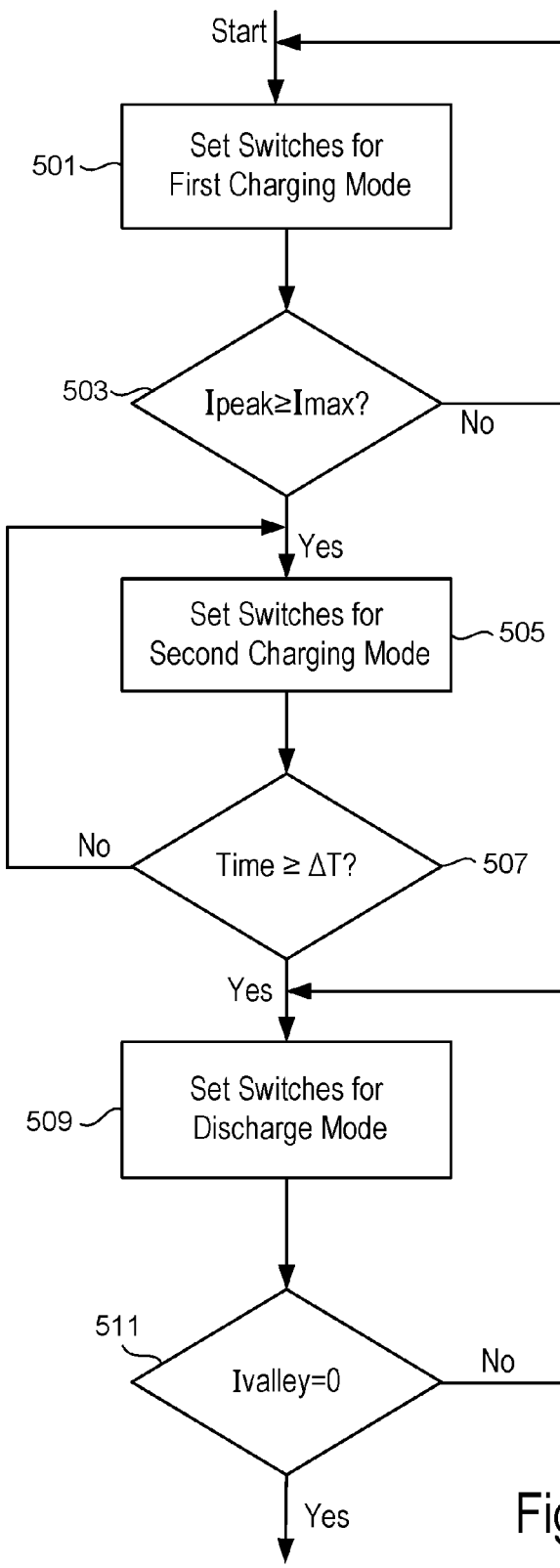
FIG. 5 is a flow diagram illustrating aspects of the control utilized for an embodiment.
Figure 6:
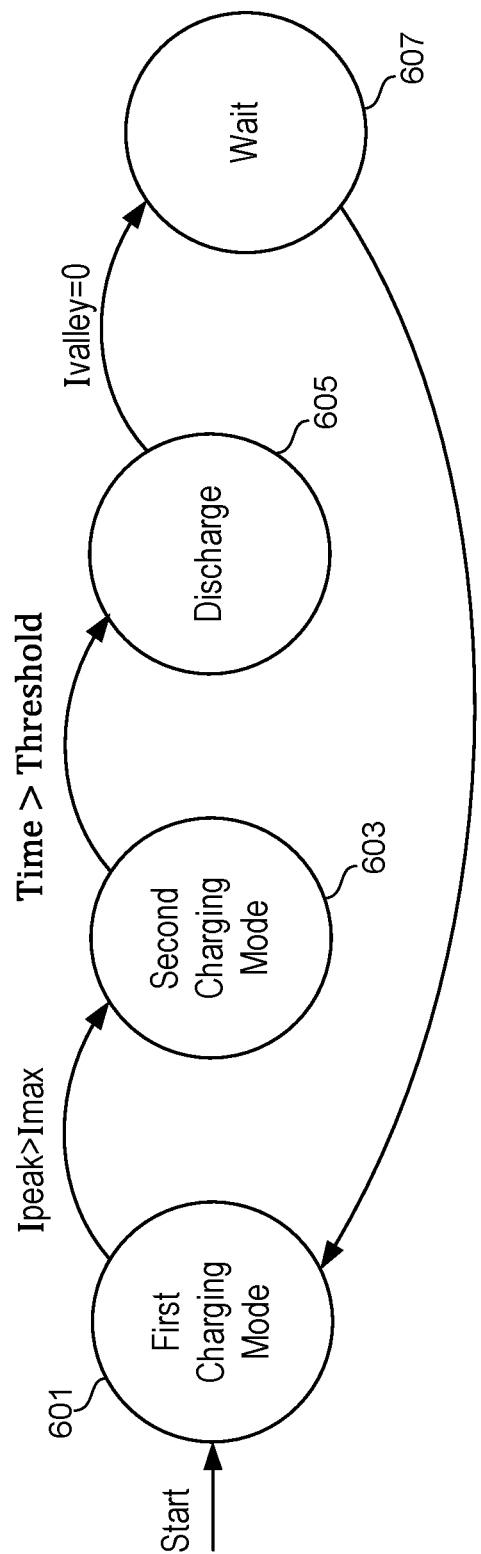
FIG. 6 illustrates a state diagram showing aspects of the control utilized for an embodiment.

Referring to FIG. 3, a DC-DC converter 300 has one inductor 301 for multiple outputs 303, 305, and 307. A battery 302 supplies the input voltage in the illustrated embodiment. In other embodiments, the input voltage may be from a different source. The charging/discharging of the inductor is time multiplexed between the outputs 303, 305, and 307. FIGS. 4, 5, and 6 illustrate new operating modes in which an additional region in the charge/discharge cycle is inserted between the charge and discharge cycles and is defined by the time duration $\Delta T$, which is used for controlled energy transfer to the load. In some embodiments, the duration of the additional region may be varied to maintain a desired control parameter, such as ripple, as explained more fully herein. Control logic 311 controls the switch settings of switches S1, S2, S3, S4$_1$, S4$_2$, . . . , S4$_n$. A time measurement circuit 315 may be used to monitor the time duration $\Delta T$. The application of switches S1, S2, S3, S4$_1$, S4$_2$, . . . , S4$_n$ is redefined from the traditional schemes of buck, boost, and buck-boost shown in FIGS. 2A, 2B, and 2C, while maintaining the basic switch topology.

The architecture described herein simultaneously improves inductor response time (time to charge or discharge) while also removing the efficiency penalty of the traditional buck-boost mode.

Referring to FIG. 4, a new operating mode is illustrated according to one embodiment. The new operating mode is referred to herein as new mode "A" for convenience. In FIG. 4 the Ton cycle 401 starts with switches S1 and S3 closed and switches S2 and S4 open. The duration of the middle (or intermediate) cycle 403, is defined by a time period $\Delta T$ rather than by the length of time for the inductor current to reach a particular level. After the end of the time period $\Delta T$, the DC-DC converter enters the Toff period 404 in which the inductor is discharged to the load. In the embodiment illustrated in FIG. 4 the load voltage is lower than the input (battery) voltage.

FIG. 5 illustrates a flow chart showing operation of the control logic 311 to control the switches. The control logic sets the switches for the first charging mode in 501. The switches remain in the first charging mode with switches S1 and S3 closed and switch S2 and all of the S4 switches open. While in the first charging mode, current sense logic 314 senses the inductor current and supplies an indication to the control logic 311, which compares the sensed current to a maximum current to see if the peak inductor current is reached. The current sense logic may utilize a well known current sense technique such as a resistor to generate a voltage based on the inductor current. The control logic 311 may compare that voltage to a predetermined voltage corresponding to Ipeak, to determine when the current maximum is reached. When the peak current is reached in 503, the control logic 311 reconfigures the switches to enter the second charging mode in 505. In the second charging mode, the middle zone 401 in FIG. 4 that lasts for $\Delta T$, the switch S1 and one of the S4 switches are closed and the switches S2 and S3 are open. The DC-DC converter 300 remains in the second charging mode (the middle zone) until the time measurement circuit 415 determines that the time period $\Delta T$ has elapsed.

Figure 7:
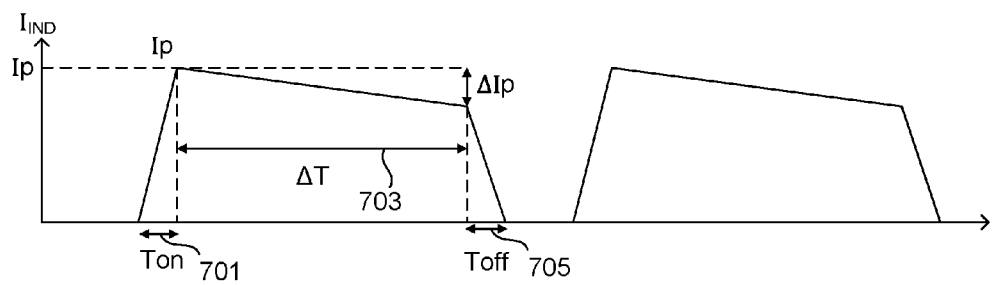
FIG. 7 illustrates current flow through the inductor for another embodiment in which a new mode A is operated as boost (output voltage higher than battery voltage).

The control logic 311 responds to the time period $\Delta T$ elapsing by reconfiguring the switches in 509 for discharge mode in which switch S2 and one of the switches S4 are closed and S1 and S3 remain open. Referring to FIGS. 4 and 7, the discharge mode (Toff) lasts until it is determined in 511 that the inductor current has reached its minimum ($I_{valley}$), which is 0 in FIG. 4. The cycle repeats at 409 determined by a frequency control loop described further herein.

Note that the shape of the middle period is trapezoidal. The current through the inductor increases from Ip 405 to the new maximum shown at 407. The trapezoidal shape represents additional charge supplied to the load. Because operating the switches for the various modes costs energy, the ability to transfer a large amount of energy in the middle period reduces the loss overhead of operating the switches. The operating mode shown in FIG. 4 provides both good response time and good efficiency. For example, as compared to, e.g., the traditional buck converter shown in FIG. 2A, the response time of the FIG. 4 embodiment is faster because of the faster inductor charge. The FIG. 4 embodiment also has good efficiency compared to, e.g., the buck-boost mode of FIG. 2C because a lot of charge is transferred as compared to the narrow charge and high frequency transfer and the associated losses associated with the high frequency transfer shown in FIG. 2C. In addition, the operating mode shown in FIG. 4 provides good tolerance for coupling, which can be particularly useful for the single inductor multiple output embodiment of FIG. 3. Note that the embodiments of FIG. 4 and the other embodiments described herein may be advantageously used in embodiments in which there is a single inductor and a single output.

FIG. 6 illustrates the control logic 311 as a state machine to achieve the three states, inductor charging 601, the middle zone 603, and the discharge state 605. The DC-DC converter starts in the inductor charge state (first charging mode) 601 with the switch settings as described above and transitions to the second charging mode (the middle zone shown as the trapezoid 406 in FIG. 4) when the inductor current is greater than or equal to Imax. The state machine remains in the second charging mode until the time measurement logic 315 determines that the elapsed time in the second charging mode is greater than or equal to $\Delta T$ at which time the DC-DC enters the discharge state 605 with the switch setting described above. When the inductor current reaches its minimum, Ivalley=0, the DC-DC converter enters a wait state 607 in which the switches are all opened when the inductor has zero energy, and the system waits for the first charging mode to start as determined by a frequency control loop control signal.

The control logic 315 may be implemented as a hardware state machine or may be implemented as a programmed microcontroller, or may be implemented in any appropriate combination of hardware and programmed logic, such as a microcontroller, as is suitable for the particular embodiment. The timing logic 315 may be implemented as part of the microcontroller or as separate timing logic such as a counter and a digital comparator to compare the count to a digital representation of $\Delta T$ and supply a signal indicative of the compare to the control logic 311.

FIG. 7 illustrates another embodiment of DC-DC converter operating in new mode A with three charging modes 701, 703, and 705. The charging modes are identical to the ones shown in FIG. 4 in terms of switch settings. The difference is that the output voltage is higher than the battery (or supply) voltage and the inductor current is being reduced in the middle zone.

Figure 8A:
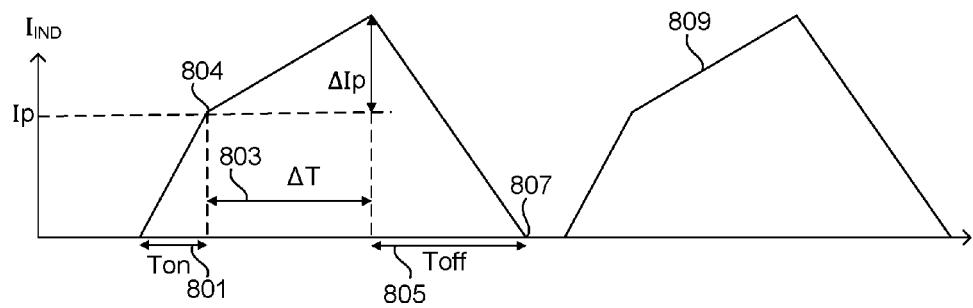
FIG. 8A illustrates current flow through the inductor for another embodiment in which the switch settings differ from the switch settings of FIG. 7.

FIG. 8A illustrates an embodiment of another new operating mode (new mode "B") in which the switch settings are set in the inductor charge mode Ton 801 to have switch S1 and one of the switches S4 closed. That switch setting corresponds to a buck mode. The DC-DC converter remains in the charge mode 801 until the inductor current reaches Ipeak. Responsive to the inductor current reaching Ipeak, the DC-DC converter transitions into the middle zone 803 in which the switch settings remain the same as the charge mode but the length of time in the middle zone is determined by $\Delta T$. While the figure shows an inflection point in the inductor current at 804, in fact, the change in slope is gradual as the output voltage gets bigger causing the rate of change of the current to be reduced. Finally, at the expiration of the time period $\Delta T$, the DC-DC converter changes to the inductor discharge mode (Toff) 805. In the discharge mode, S2 and one of the S4 switches are closed and S1 and S3 are open. The DC-DC converter discharges the inductor Toff until the inductor current reaches its minimum at 807 and then the DC-DC converter waits for the cycle to repeat at 809. New mode B may be particularly useful in startup situations where the load voltage is zero or close to zero. FIG. 8B shows a table with the various switch settings for the various modes described herein.

The ability to control $\Delta T$ affords the designer an additional degree of freedom to achieve particular trade-offs in DC-DC operation, in e.g., inductor or capacitor sizing, peak current Ip, transient performance or start-up time, or output voltage ripple. The additional region $\Delta T$ can be either set by the user, or employed as part of the overall feedback control loop as described further herein. For example, in an embodiment, the extra degree of freedom based on timing control allows implementation of a secondary control loop based on timing that can be used to improve DC-DC operating performance, such as reducing or controlling output ripple.

Figure 9:
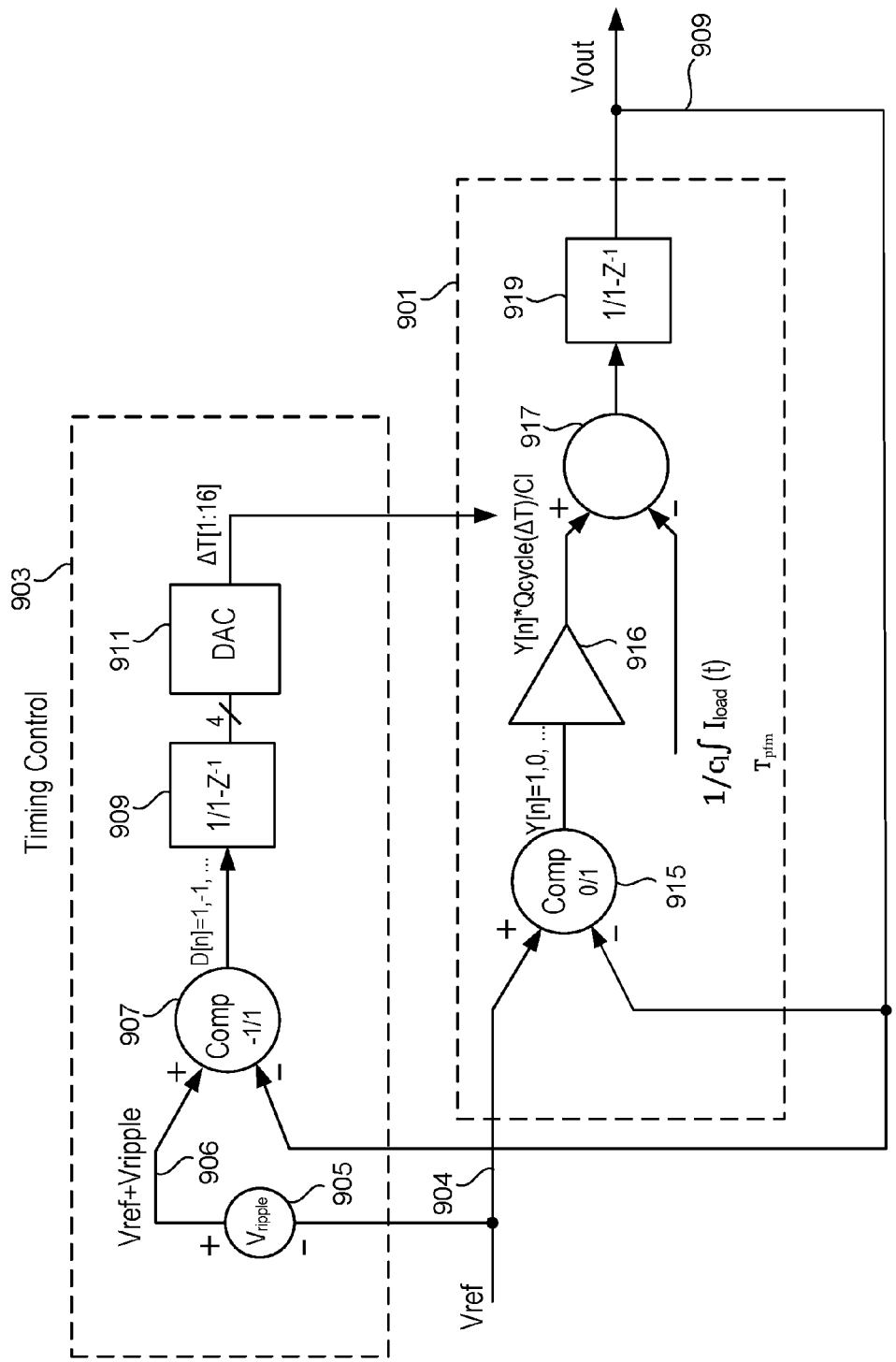
FIG. 9 illustrates a control loop that adjusts $\Delta T$ automatically based on ripple voltage.

Referring to FIG. 9, the control loop 901 provides frequency control for the DC-DC converter. The timing control loop 903 locks on the ripple voltage to set $\Delta T$ based on the ripple voltage. The timing control loop 903 utilizes a reference voltage 904 (Vref)+the maximum desired ripple voltage (Vripple) 905 as the ripple voltage reference 906. The comparator 907 receives the ripple voltage reference 906 and the output voltage 909. The comparator supplies a 1 if the output voltage is greater than the ripple voltage reference 906 and a −1 if the output voltage is less than the ripple voltage reference 906. The integrator 909 integrates the output of the comparator and thus operates to average the ripple and supplies the integrated value to a timing digital to analog converter (DAC) 911. The larger the $\Delta T$, the larger the amount of charge transferred to the holding capacitor (e.g. $C_1$, $C_2$, $C_n$ in FIG. 3) in each cycle and the larger the ripple voltage. Thus, the timing control loop acts to shorten $\Delta T$ to reduce ripple voltage or increase $\Delta T$ if the ripple voltage is below the desired ripple. A larger $\Delta T$ can increase efficiency by reducing the frequency of the DC-DC converter cycle. The DAC 911 supplies the frequency control loop 901 the output $\Delta T$ of the DAC 911. In the embodiment shown in FIG. 9, $\Delta T[1:16]$ is analog time value with sixteen time increments. That allows the middle zone to vary from 0 (or 1)×$\Delta T$ to 15 (or 16)×$\Delta T$. The analog increments can be implemented in various ways. For example, a current source may be used to charge a capacitor to a certain voltage corresponding to $\Delta T[1:16]$ where one or more of the charging current, capacitor, and final voltage are resolved into 16 discrete steps.

The frequency control loop compares the reference voltage 904 with the output voltage 909 in comparator 915. If the reference voltage is larger than the output voltage the comparator 915 supplies a 1 indicating that additional charge needs to be provided to the output and the frequency of the DC-DC converter cycle may need to be increased. A 0 from the comparator indicates that sufficient charge is being supplied by the DC-DC converter and the cycle frequency may be left unchanged or reduced. The output of the comparator is multiplied in 916 by the charge ((Qcycle) over $\Delta T$)/C1, where C1 is the load capacitance or the holding capacitor (e.g. $C_1$, $C_2$, $C_n$ in FIG. 3). The frequency of the cycling is determined implicitly. In a pulse frequency modulation (PFM) scheme the output voltage comparator 915 determines if the holding capacitor needs more "charge" or not. If more charge is needed, then another cycle is initiated. The load condition determines the PFM frequency through the comparator output. The need for more load current results in more cycles per second, and thus a higher PFM frequency and the need for less load current results in fewer cycles per second and thus a lower PFM frequency. Qcycle depends on the parameters such as: Vbat, Vout, $\Delta T$, and Ipeak.

The output of 916 is supplied to the summing circuit 917. The summing circuit also receives the value $1/C_1 \int I_{load}(t)$, which represents the amount of current withdrawn from the holding capacitor over a cycle or the voltage reduction of the holding capacitor. The positive input to summing circuit 917 represents the amount of charge supplied to the holding capacitor from the inductor as part of the PFM cycle. The output of the summing circuit 917 is supplied to the integrator 919, which integrates the difference between the charge supplied to the holding capacitor and discharged to the load from the holding capacitor. The output of the integrator 919 is used to control the PFM cycle of the DC-DC converter.

Note that a constant $\Delta T$ could be used in the frequency control loop 901. If $\Delta T$ is too large then ripple voltage may be too large and if $\Delta T$ is too small then the DC-DC cycle frequency may increase resulting in less efficiency. Thus, controlling $\Delta T$ in a control loop can be advantageous in providing acceptable ripple and efficiency.

Figure 10:
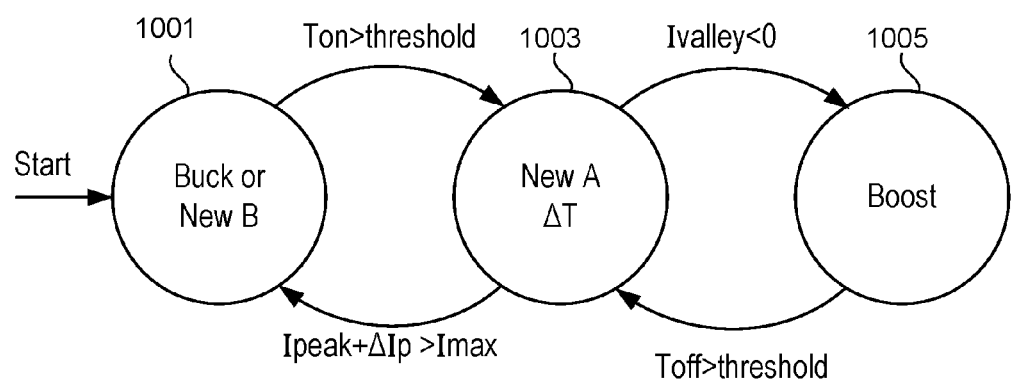
FIG. 10 shows state diagram controlling seamless operation across multiple modes (buck, boost, and new modes).

Additionally, these new modes allow for the DC-DC converter 300 to operate seamlessly without the need to pre-determine the operating mode. Each output goes to its desired final voltage value crossing from one mode to another based on the timing information. FIG. 10 illustrates a state diagram that allows the converter to automatically transition between operating in buck mode or new mode B in 1001, new mode A in 1003, and boost mode in 1005. The control logic to implement the state diagram may be part of control logic 311.

Buck mode is typically used when the input voltage, e.g., from a battery is higher than an output voltage. For example, the battery may be nominally 5V and the output voltage is 1.8V or 3V. The boost mode is typically used to step up voltage from, e.g, 2V to 3V. When the input voltage gets close to the output voltage, buck-boost mode is commonly used. That can occur when, e.g., a battery ages and the lower battery voltage gets closer to the output voltage.

At the beginning of a DC-DC converter operation, the output may be discharged so starting in buck mode, with the inductor coupled between the battery and the load, allows charge to be supplied to the load. So in the control logic shown in FIG. 10, the DC-DC converter starts in buck or new mode B in 1001. As explained above, new mode B which starts off in a traditional buck mode and then transitions to a timing based middle portion of the cycle before ending with an inductor discharge period. As the output voltage rises and gets closer to the input voltage, the voltage across the inductor gets smaller and it takes longer for the inductor to reach Ipeak (see Ip in FIG. 2A and FIG. 8A). The time measurement logic 315 (FIG. 3) monitors the time in Ton and Toff and supplies the readings to control logic 311. If the Ton time becomes larger than a predetermined threshold indicating that the output voltage is close to the input voltage, the state machine transitions the DC-DC converter to operate in new mode A. In that way a quicker response of the DC-DC converter can be provided. The DC-DC converter can operate in state 1003 (new mode A) until the Ipeak+ΔIp>Imax. Imax represents a maximum safe current for the DC-DC converter. That can indicate that the rise in current during the intermediate portion 403 (see FIG. 4) is too great. If Ipeak+ΔIp>Imax, then the control logic returns the DC-DC converter to state 1001 to operate in buck mode or in new mode B.

Another condition that causes a transition from new mode A (state 1003) is for Ivalley<0. It is assumed that Ivalley normally equals zero. However it might be possible that during discharge the inductor current may briefly go negative. The exact value of the current is determined by the voltage across the inductor and the duration of time such voltage is applied. During "normal" operation of new mode A during boost function (mode A as boost as shown in FIG. 7) the inductor current going briefly negative does not usually happen unless the output voltage is significantly higher than the battery voltage. If the inductor current turns negative during the discharge portion of the new mode A, the DC-DC converter transitions to operate in boost mode 1005. A transition out of boost mode 1005 occurs if the Toff time (see FIG. 2B)>than a Toff threshold. If so, the DC-DC converter transitions back to new mode A (state 1003). Thus, the control logic automatically transitions the DC-DC converter between the various modes based on inductor current (Ipeak and Ivalley) and based on the time spent in Toff and Ton. Thus, the DC-DC converter can effectively start up in one mode, and switch to a more efficient and responsive operating mode at an appropriate time. Thus, the DC-DC converter of utilizing the control logic shown in FIG. 10 seamlessly operates across multiple modes (buck, boost, new mode A, new mode B) without manual intervention or pre-arranged mode setting.

Various embodiments have been described for operating a DC-DC converter with new modes. The new modes improve the load servicing ability of the DC-DC converter by raising the average energy delivered to the load per cycle, as well as making it more tolerant to coupling effects from other outputs (tendency of some outputs to hold on to the inductor for too long thus starving other outputs). Embodiments described herein provide higher power efficiency over a significant portion of the operating range. Embodiments described herein are less prone to interaction between multiple outputs; ability to service higher loads over significant operating range.

Thus, various aspects of operating a DC-DC converter have been described. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method for operating a voltage converter comprising:
operating the voltage converter in a first charging mode until current through an inductor reaches a first current threshold;
after the first charging mode, changing to operate the voltage converter in an intermediate charging mode, in which current is supplied to a load until an end of a time period;
in response to the end of the time period operating the voltage converter in a third charging mode, the third charging mode being a discharge mode;
in a timing control loop,
comparing an output voltage of the voltage converter to a ripple voltage reference and supplying a first comparison indication;
determining the time period for operating in the intermediate charging mode based on the first comparison indication;
in a frequency control loop,
comparing a reference voltage to the output voltage and supplying a second comparison indication;
determining a pulse frequency modulation (PFM) frequency of the voltage converter based in part on the second comparison indication and based in part on the time period determined in the timing control loop.

2. The method as recited in claim 1, wherein operating the voltage converter in the first charging mode comprises:
coupling a first side of the inductor to an input voltage and a second side of the inductor to a second voltage.

3. The method as recited in claim 2, wherein operating the voltage converter in the intermediate charging mode comprises:
coupling the first side of the inductor to the input voltage and the second side of the inductor to the load.

4. The method as recited in claim 1, wherein operating the voltage converter in a first charging mode comprises:
coupling the first side of the inductor to an input voltage and a second side of the inductor to the load.

5. The method as recited in claim 4, wherein operating the voltage converter in the intermediate charging mode comprises:
coupling the first side of the inductor to the input voltage and the second side of the inductor to the load.

6. The method as recited in claim 3, wherein the current through the inductor is increasing during the intermediate charging mode.

7. The method as recited in claim 3, wherein the current through the inductor is decreasing during the intermediate charging mode.

8. The method as recited in claim 2, wherein operating in the discharge mode comprises:
coupling the first side of the inductor to the second voltage and the second side of the inductor to the load.

9. A voltage converter comprising:
an inductor;
a control logic;
a plurality of switches configurable by the control logic to place the voltage converter in a first charging mode, until a current through the inductor reaches a first current threshold;
wherein the control logic is responsive to the current through the inductor reaching the first current threshold to configure the switches to cause the voltage converter to operate in a second charging mode in which a first side of the inductor is coupled to an input voltage and a second side of the inductor is coupled to a load;
a compare logic configured to compare an elapsed time in the second charging mode to a time threshold to determine an end of the second charging mode; and
wherein responsive to the end of the second charging mode, the control logic configures the switches to operate the voltage converter in a discharge mode in which the first side of the inductor is coupled to a ground node and the second side of the inductor is coupled to the load;
wherein the control logic includes,
 a timing control loop configured to determine the time threshold for operating in the second mode based on a comparison of an output voltage of the voltage converter to a ripple voltage reference, the ripple voltage reference formed from a reference voltage and a maximum desired ripple voltage, the timing control loop including a comparator to perform the comparison of the output voltage to the ripple voltage reference; and
 a frequency control loop configured to compare the reference voltage to the output voltage and supply a comparison indication, the frequency control loop further configured to determine a pulse frequency modulation (PFM) frequency of the voltage converter based in part on the comparison indication and based in part on the time threshold.

10. The voltage converter as recited in claim 9, wherein in the first charging mode the first side of the inductor is coupled to the input voltage and the second side of the inductor is coupled to the ground node.

11. The voltage converter as recited in claim 9, wherein in the first charging mode of the first side of the inductor is coupled to the input voltage and the second side of the inductor is coupled to the load.

12. The voltage converter as recited in claim 9, wherein the current through the inductor is increasing during the second charging mode.

13. The voltage converter as recited in claim 9, wherein the current through the inductor is decreasing during the second charging mode.

14. A DC-DC converter comprising:
a plurality of switches configured to be in a first charging mode, until current through an inductor reaches a first current threshold to thereby indicate an end of the first charging mode;
wherein responsive to the end of the first charging mode the plurality of switches are configured to cause the DC-DC converter to operate in a second charging mode for a time period in which a first side of the inductor is coupled to an input voltage and a second side of the inductor is coupled to a load; and
wherein responsive to an end of the time period, the plurality of switches are configured to cause the DC-DC converter to operate in a discharge mode;
control logic configured to configure the plurality of switches, the control logic including,
 a timing control loop configured to determine the time period for operating in the second charging mode based on a comparison of an output voltage of the DC-DC converter to a ripple voltage reference, the timing control loop including a comparator to perform the comparison of the output voltage to the ripple voltage reference; and
 a frequency control loop configured to compare a reference voltage with the output voltage and supply a comparison indication, the frequency control loop further configured to determine a pulse frequency modulation (PFM) frequency of the DC-DC converter based in part on the comparison indication and based in part on the time period.

15. The method as recited in claim 1 further comprising: forming the ripple voltage reference by adding a maximum desired ripple voltage to the reference voltage.

16. The DC-DC converter as recited in claim 14 wherein the ripple voltage reference differs from the reference voltage by a maximum desired ripple voltage.

* * * * *